UNITED STATES PATENT OFFICE 2,353,706

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 15, 1942, Serial No. 447,163

8 Claims. (Cl. 252—341)

This invention relates primarily to the resolution of petroleum emulsions.

The main object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

We have discovered that if one oxyalkylates glycerol so as to introduce at least three oxyalkylene radicals for each hydroxyl group, and if the product so obtained is reacted with a polybasic carboxy acid having not over eight carbon atoms, and in such a manner as to yield a fractional ester, due to the presence of at least one free carboxyl radical, one can then esterify said acidic material or intermediate product with at least one mole of an alcoholic compound of the type herein described to give a variety of new compositions of matter which have utility in the demulsification of crude oil.

The compounds herein contemplated may be produced in any suitable manner, but are usually manufactured by following one of two general procedures. In one of said procedures the oxyalkylated glycerol, which is, in essence, a polyhydric alcohol, is reacted with a polybasic acid so as to give an acidic material, or intermediate product, which, in turn, is reacted with an alcoholic body of the kind hereinafter described, and momentarily indicated by the formula $R_1(OH)_m$. Generically, the alcoholic body herein contemplated may be considered a member of the class in which $m$ may vary from 1 to 10, although the specific significance of $m$ in the present instance will be hereinafter indicated. The second procedure is to react an alcohol of the formula $R_1(OH)_m$ with a polybasic acid so as to produce an intermediate product, and then react said intermediate product or fractional ester with the selected axyalkylated glycerol.

Glycerol may be conveniently indicated by the following formula:

If treated with an oxyalkylating agent, and momentarily consideration will be limited to an oxyethylating agent, one may obtain an oxyethylated glycerol of the following formula type:

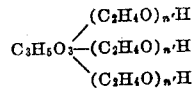

in which the value of $n'$ may vary from 3 to 10 and all the values of $n'$ need not be identical. If a polybasic carboxy acid be indicated by the formula:

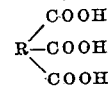

then the acyclic reaction product of one mole of oxyethylated glycerol and one mole of a polybasic carboxy acid may be indicated by the following formula:

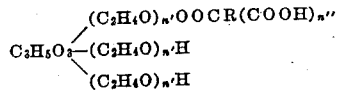

in which $n''$ has the value of one or two. Similarly, if two moles of the polybasic acid be used, then the compound may be indicated by the following formula:

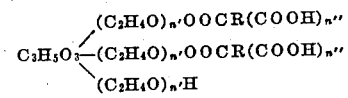

Likewise, if three moles of a polybasic acid are employed, the compound may be indicated by the following formula:

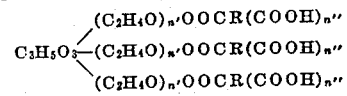

If a fractional ester of the kind exemplified by the three preceding formulas is reacted with one or more moles of an alcohol of the kind previously described in a generic sense as $R_1(OH)_m$, then obviously, one may obtain a material of the type indicated by the following formula:

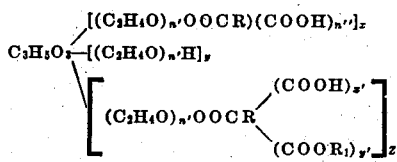

in which $x$ is 0, 1 or 2, $y$ is 0, 1 or 2, and $z$ is 1, 2 or 3, and $x'$ is 0 or 1, and $y'$ is 1 or 2.

It has been previously stated that compounds of the type herein contemplated may be obtained by oxyalkylating agents, without being limited to ethylene oxide. Suitable oxyalkylating agents include ethylene oxide, propylene oxide, butylene oxide and glycid, which, although not included, strictly speaking, by the unitary structure $C_nH_{2n}O$, is included within the meaning of the hereto appended claims and may be simply considered as a variant of propylene oxide, i. e., hydroxypropylene oxide. Similarly, where a carboxylic hydrogen atom appears, it may be replaced by metal, an ammonium radical, or substituted ammonium radical, or by an organic group derived from an alcohol, such as an aliphatic alcohol, an aralkyl alcohol, or an alicyclic alcohol. It may also be converted into an amide, including a polyaminoamide. Thus, the preceding formula may be rewritten in its broader scope, as follows:

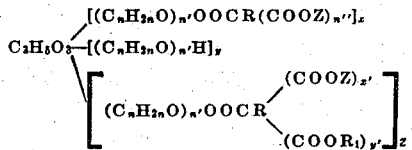

in which $n$ replaces the numbers 2, 3 or 4, $z$ includes the acidic hydrogen atom itself. In the above formula, and hereafter for convenience, $R_1$ is intended to include any hydroxyl groups that remain.

If the compounds herein contemplated are obtained under usual conditions, at the lowest temperatures, then the monomeric form is most likely to result.

The production of the compounds herein contemplated is the result of one or more esterification steps. As is well known, esterification procedures can be carried out in various manners, but generally speaking, esterifications can be carried out at the lowest feasible temperatures by using one or several procedures. One procedure is to pass an inert dried gas through the mass to be esterified, and have present at the same time a small amount of a catalyst, such as dried HCl gas, a dried sulfonic acid, or the like. Another and better procedure, in many instances, is to employ the vapors of a suitable liquid so as to remove any water formed and condense both the vapors of the liquid employed and the water in such a manner as to trap out the water and return the liquid to the reacting vessel. This procedure is commonly employed in the arts, and for convenience, reference is made to U. S. Patent No. 2,264,759, dated December 2, 1941, to Paul C. Jones.

Referring again to the last two formulas indicating the compounds under consideration, it can be readily understood that such compounds, in numerous instances, have the property of polyfunctionality. In view of this fact, where there is at least one residual carboxyl and at least, one residual hydroxyl, one would expect that under suitable conditions, instead of obtaining the monomeric compounds indicated, one would, in reality, obtain a polymer in the sense, for example, that polyethylene glycols represent a polymer of ethylene glycol. The term "polymer" is frequently used to indicate the polymerized product derived from a monomer in which the polymer has the same identical composition as the monomer. In the present instance, however, polymerization involves the splitting and loss of water so that the process is essentially self-esterification. Thus, strictly speaking, the polymeric compounds are not absolutely isomers of the monomeric compounds, but since, for all practical purposes, they can be so indicated, and since such practice is common in the arts concerned with materials of this type, it is so adopted here. Thus, reference in the appended claims to polymers is intended to include the self-esterification products of the monomeric compounds.

In view of what has been said, and in view of the recognized hydrophile properties of the recurring oxyalkylene linkages, particularly the oxyethylene linkage, it is apparent that the materials herein contemplated may vary from compounds which are clearly water-soluble through self-emulsifying oils, to materials which are balsam-like and sub-resinous or semi-resinous in nature. The compounds may vary from monomers to polymers, in which the unitary structure appears a number of times, for instance, 10 or 12 times. It is to be noted that true resins, i. e., truly insoluble materials of a hard plastic nature, are not herein included. In other words, the polymerized compounds are soluble to a fairly definite extent, for instance, at least 5% in some solvents, such as water, alcohol, benzene, dichloroethyl ether, acetone, cresylic acid, acetic acid, ethyl acetate, dioxane, or the like. This is simply another way of stating that the polymerized product contemplated must be of the sub-resinous type, which is commonly referred to as an A resin, or a B resin, as distinguished from a C resin, which is a highly infusible, insoluble resin (see Ellis, Chemistry of Synthetic Resins (1935), pages 862, et seq.).

Reviewing the form as presented, it is obvious that one may obtain compounds within the scope disclosed, which contain neither a free hydroxyl nor a free carboxyl group, and one may also obtain a compound of the type in which there is present at least one free carboxyl, or at least, one free hydroxyl, or both. The word "polar" has sometimes been used in the arts in this particular sense to indicate the presence of at least one free hydroxyl group, or at least, one free carboxyl group, or both. In the case of the free carboxyl group, the carboxylic hydrogen atom may, of course, be replaced by any ionizable hydrogen atom equivalent, such, for example, as a metal, an ammonium radical, a substituted ammonium radical, etc. In the hereto appended claims the word "polar" is used in this specific sense.

We are aware that compounds similar to those contemplated in the present instance may be derived from polyhydroxylated compounds having more than three hydroxyl groups. For instance, they may be derived from acyclic diglycerol, triglycerol, tetraglycerol, mixed polyglycerols, mannitol, sorbitol, various hexitols, dulcitol, pentaerythritol, sorbitan, mannitan, dipentaerythritol monoether, and other similar compounds. Such particular types in which higher hydroxylated materials are subjected to oxyalkylation and then employed in the same manner as oxyalkylated glycerol, is employed in the present instance, are not contemplated in this specific case, although attention is directed to the same.

Reference is also made to other oxyalkylated compounds which may be used as reactants to replace oxyalkylated glycerol, or oxyalkylated ethylene glycol, which latter reactant is described in a co-pending application hereinafter referred to. The reactants thus contemplated include the type in which there is an amino or amido nitrogen atom, particularly, when present in a low molal type of compound prior to oxyalkylation, reference being made to polyhydroxylated materials, including those having two or three hydroxyl groups, as well as those having more than three hydroxyl groups. For instance, the oxyalkylated derivatives, particularly the oxyethylated derivatives of ethyldiethanolamine, bis(hydroxyethyl)acetamide, the acetamide of tris(hydroxymethyl)aminomethane, tetrahydroxylated ethylene diamine, etc. Compounds may also be derived from cyclic diglycerol and the like.

Furthermore, for convenience, attention is directed to a somewhat similar class of materials which are described in our co-pending application Serial No. 401,379, filed July 7, 1941. Said co-pending application involves the use of the same type of alcoholic bodies for reactants, but is limited, among other things, to the compounds which are essentially symmetrical in nature, for instance, involving the introduction of two alcoholic residues, whereas, in the present instance, one, two, or three, or more, might be introduced.

As indicated previously, the polybasic acids employed are limited to the type having not more than eight carbon atoms, for example, oxalic, malonic, succinic, glutaric, adipic, maleic, and phthalic. Similarly, one may employ acids such as fumaric, glutaconic, and various others, such as citric, malic, tartaric, and the like. The selection of the particular tribasic or dibasic acid employed, is usually concerned largely with the convenience of manufacture of the finished ester, and also the price of the reactants. Generally speaking, phthalic acid or anhydride tends to produce resinous materials, and greater care must be employed if the ultimate or final product be of a sub-resinous type. Specifically, the preferred type of polybasic acid is such as to contain six carbon atoms or less. Generally speaking, the higher the temperature employed, the easier it is to obtain large yields of esterified product, although polymerization may be stimulated. Oxalic acid may be comparatively cheap, but it decomposes readily at slightly above the boiling point of water. For this reason it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable, and also, everything else considered, the cost is comparatively low on a per molar basis, even though somewhat higher on a per pound basis. Succinic acid or the anhydride has many attractive qualities of maleic anhydride, and this is also true of adipic acid. For purposes of brevity, the bulk of the examples, hereinafter illustrated, will refer to the use of maleic anhydride, although it is understood that any other suitable polybasic acid may be employed. Furthermore, reference is made to derivatives obtained by oxyethylation, although, as previously pointed out, other oxyalkylating agents may be employed.

As far as the range of oxyethylated glycerols employed as reactants is concerned, it is our preference to employ those in which approximately 15 to 24 oxyethylene groups have been introduced into a single glycerol molecule. This means that approximately five to eight oxyethylene radicals have been introduced for each original hydroxyl group.

The oxyalkylation of glycerol is a well known procedure (see Example 11 of German Patent No. 605,973, dated November 22, 1934, to I. G. Farbenindustrie Akt. Ges.). The procedure indicated in the following three examples is substantially identical with that outlined in said aforementioned German patent.

OXYETHYLATED GLYCEROL

Example 1

184 pounds of glycerol is mixed with ½%, by weight, of caustic soda solution having a specific gravity of 1.383. The caustic soda acts as a catalyst. The ethylene oxide is added in relatively small amounts, for instance, about 44 pounds at a time. The temperature employed is from 150–180° C. Generally speaking, the gauge pressure during the operation approximates 200 pounds at the maximum, and when reaction is complete, drops to zero, due to complete absorption of the ethylene oxide. When all the ethylene oxide has been absorbed and the reactants cooled, a second small portion, for instance, 44 more pounds of ethylene oxide, are added and the procedure repeated until the desired ratio of 15 pound moles of ethylene oxide to one pound mole of glycerol is obtained. This represents 660 pounds of ethylene oxide for 92 pounds of glycerol.

OXYETHYLATED GLYCEROL

Example 2

The ratio of ethylene oxide is increased to 18 pound moles for each pound mole of glycerol. Otherwise, the same procedure is followed as in Example 1, preceding.

OXYETHYLATED GLYCEROL

Example 3

The same procedure is followed as in the two previous examples, except that the ratio of ethylene oxide to glycerol is increased to 21 to one.

OXYETHYLATED GLYCEROL MALEATE

Example 1

One pound mole of oxyethylated glycerol (1 to 15 ratio) prepared in the manner previously described is treated with one pound mole of maleic anhydride and heated at approximately thirty minutes to two hours, with constant stirring, so as to yield a monomaleate.

OXYETHYLATED GLYCEROL MALEATE

Example 2

The same procedure is followed as in the preceding example, except that two moles of maleic anhydride are employed so as to obtain the dimaleate instead of the monomaleate.

Oxyethylated Glycerol Maleate
Example 3

The same procedure is followed as in the two preceding examples, except that three moles of maleic anhydride are employed so as to obtain the trimaleate.

Oxyethylated Glycerol Maleate
Example 4

The same procedure is employed as in the preceding examples, except that oxyethylated glycerol (ratio 1 to 18) is substituted in place of oxyethylated glycerol (ratio 1 to 15).

Oxyethylated Glycerol Maleate
Example 5

The same procedure is employed as in the preceding examples, except that oxyethylated glycerol (ratio 1 to 21) is employed instead of oxyethylated glycerol (ratio 1 to 15) or (1 to 18).

Previous reference has been made to an alcoholic body which has been defined generically by the formula $R_1(OH)_m$. The sub-generic class of alcoholic compounds employed as reactants in the manufacture of the present compounds, are oxyalkylated imidazolines substituted in 2-position by a radical containing 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical:

$$—N—(R—O)_nH; \quad —NH—(R—O)_nH$$

wherein R denotes an aliphatic radical and $n$ is a whole number greater than 2 and less than 11.

The intermediate products herein contemplated for reaction with materials such as ethylene glycol dihydrogen dimaleate, are characterized by having a five-membered heterocyclic ring with two atoms different from carbon. More specifically, they may be considered as derivatives of imidazole, frequently referred to as glyoxaline. Imidazole (glyoxaline) is indicated by the following formula:

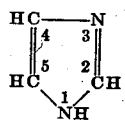

The imidazolines or glyoxalidines may be considered as dihydro-derivatives of imidazole (glyoxaline); and thus the expressions "dihydroglyoxalines" and "glyoxalidines" are often employed. The introduction of two hydrogen atoms at the 4–5 position results in the conversion of imidazole into dihydroglyoxaline, which may be indicated by the following formula:

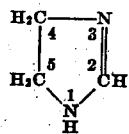

As to the manufacture of imidazolines, reference is made to the following patents: U. S. Patents Nos. 2,215,861, 2,215,862, 2,215,863, and 2,215,864, dated September 24, 1940, to Waldmann and Chwala.

Imidazolines or glyoxalidines may be regarded as dehydration products of certain amides; and they may be obtained by reacting polyamines and the higher carboxylic acids under certain conditions. The formation of these glyoxalidine compounds, while forming no part of the present invention, is indicated by the following scheme:

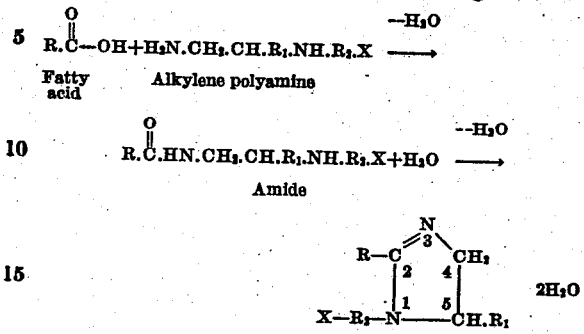

1, 2-disubstituted glyoxalidine wherein R represents an alkyl or alkenyl group containing from 10 to 20 carbon atoms (the residue of a higher fatty acid); $R_1$ represents hydrogen or a lower alkyl group; $R_2$ represents an alkylene group, or a lower alkyl substituted alkylene group; and X represents a hydroxyl group, an amino group, or an amino-alkylene substituted amino group. See U. S. Patent No. 2,214,152, dated September 10, 1940, to Wilkes.

See also U. S. Patents Nos. 2,155,877 and 2,155,878, both dated April 25, 1939, to Waldmann and Chwala.

The expression "higher molecular weight carboxy acids" is an expression frequently employed to refer to certain organic acids, particularly monocarboxy acids, having more than six carbon atoms, and generally, less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids including caprylic acid, heptylic acid, caproic acid, capric acid, pimelic acid, sebacic acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetylricinoleic acid, linoleic acid, linolenic acid, lauric acid, myristic acid, undecyclenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil and other fish oils, teaseed oil, partially or completely hydrogenated animal and vegetable oils, such as these mentioned; hydroxy and alpha-hydroxy higher carboxylic, aliphatic and fatty acids, such as hydroxystearic acid, dihydroxypalmitic acid, dihydroxystearic acid, dihydroxybehenic acid, alphahydroxy capric acid, alphahydroxystearic acid, alphahydroxy palmitic acid, alphahydroxy lauric acid, alphahydroxy myristic acid, alphahydroxy cocoanut oil mixed fatty acids, alpha hydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy-diphenyl, naphthenic, and abietic acid; aralkyl and aromatic acids, such as hexahydrobenzoic acid, hydrogenated naphthoic, hydrogenated polycarboxy-diphenyl, naphthenic, and abietic acid; aralkyl and aromatic acids, such as benzoic acid, Twitchell fatty acids, naphthoic acid, carboxydiphenyl, pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorstearic acid, etc.

Another source of suitable acids are those commonly referred to as lac acids, such, for example, as the acids derived from shellac. Such acids include various polyhydroxy acids, for example, aleuritic acid, shelloic acid, and kerrolic acid.

As is well known, one may use substituted acids in which some other non-functional constituent enters the structure of the fatty acid. For instance, one may use aryl-, hydroxy-, alkoxy-, chloro-, keto-, and amino-derivatives. Generally speaking, however, it is always preferable to use the unsubstituted acid, particularly free from substituents which contain either oxygen or nitrogen atoms. Generally speaking, the introduction of hydrocarbon radicals, regardless of source, has little effect, except in altering the hydrophile-hydrophobe balance.

One may also employ the blown or oxidized acids, such as blown ricinoleic acid, blown oleic, etc., or estolides derived from blown oils, such as blown castor oil, blown soyabean oil, etc.

Needless to say, the acids themselves need not be employed; but one may readily employ any functional equivalent, such as the anhydrides, the acyl chloride, or the like. In some instances, the esters, especially in presence of a trace or a significant amount of water, act as the acid itself, in that the acid is liberated. Unless specific reference is made to a particular isomer, one may employ any isomer or mixture of various isomers, if the acid or acids are so available. We have produced demulsifiers, for use in our process, by the following procedures:

HYDROXYLATED INTERMEDIATE

Example 1

1-aminoethyl-2-heptadecenyl glyoxalidine is prepared by mixing one gram mole (282 grams) of oleic acid with two gram moles (206 grams) of diethylene triamine, and heating the mixture for a period of about 16 hours under a distilling column. Water was continuously removed until a temperature of about 245° C. was reached. The quantity of water thus removed amounted to about 1.7 moles. Unreacted diethylene triamine was distilled from the reaction mixture under vacuum, and the residue then was purified by distillation at an absolute pressure of 1 mm. of mercury, at which point it boiled within a temperature range of 225° to 250° C. About 220 grams of the 1-aminoethyl-2-heptadecyl gloxalidine was obtained as a pale yellow liquid. The product also may be designated, by reference to the reactants used in its preparation, as oleyl diethylene triamine.

Ethylene oxide is introduced into the above base at a temperature of about 120–140° C., until the increase in weight amounts to about 2½ pound moles of ethylene oxide calculated upon one pound mole of the base.

HYDROXYLATED INTERMEDIATE

Example 2

The base used in the preceding example is replaced by 1-(aminoethyl ethylamino)-2-heptadecenyl glyoxalidine. This glyoxalidine was prepared by reacting 1 gram mole of oleic acid with three gram moles (438 grams) of triethylene tetramine in a vessel equipped with a distilling column. The mixture was heated for a period of about six hours, and water was continuously removed until a temperature of about 300° C. was reached. Approximately 1.9 moles of water were thus removed. The reaction mixture was then distilled under vacuum to remove excess triethylene tetramine.

HYDROXYLATED INTERMEDIATE

Example 3

Tetraethylenepentamine is substituted for triethylene tetramine as a reactant in the preceding example. The glyoxalidine obtained was treated as before with ethylene oxide.

HYDROXYLATED INTERMEDIATE

Example 4

Lauric acid is substituted as a reactant for oleic acid in the three preceding examples.

HYDROXYLATED INTERMEDIATE

Example 5

Ricinoleic acid is substituted for oleic acid in Examples 1–3, preceding.

HYDROXYLATED INTERMEDIATE

Example 6

Naphthenic acid is substituted for oleic acid in Examples 1–3, preceding.

HYDROXYLATED INTERMEDIATE

Example 7

An equivalent molal amount of propylene oxide is substituted for ethylene oxide in Examples 1–6, preceding.

The preferred type of demulsifier is obtained by the action of 2–10 moles of the oxyalkylating agent, for instance, ethylene oxide or propylene oxide, on one mole of the imidazoline.

In the hereto appended claims, the addition products formed by reaction with acids or the basic form by reaction with water, is included within the scope of the claims. Similarly, where the claims specify the presence of the group:

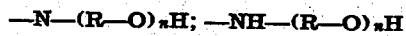

i. e., the group introduced by oxyalkylation at the amino hydrogen position, it is understood that R includes groups derived from glycid or the like.

Specific attention is directed to the fact that one may use various oxyalkylating agents in addition to those already indicated. For instance, note the oxyalkylating agents specifically enumerated in the aforementioned U. S. Patent No. 2,211,001, and also in U. S. Patent No. 2,208,581, dated July 23, 1940, to Hoeffelmann. All the oxyalkylating agents mentioned in both of the previously designated patents may be employed as reactants for the manufacture of demulsifying agents contemplated in the present process.

COMPLETED MONOMERIC DERIVATIVE

Example 1

One pound mole of a product of the kind described under the heading "Oxyethylated glycerol maleate, Example 1" is reacted with one pound mole of "Hydroxylated intermediate, Example 1" preferably in the absence of any high boiling hydrocarbon or inert solvent. However, if an inert vaporizing solvent is employed, it is generally necessary to use one which has a higher boiling range than xylene; and sometimes removal of such solvent might present a difficulty. In other instances, however, such high boiling inert vaporizing solvent, if employed, might be permitted to remain in the reacted mass and appear as a constituent or ingredient of the final product. In any event, our preference is to conduct the reaction in the absence of any such solvent and permit the reaction to proceed with the elimination of water. The temperature of reaction is about 180 to 200° C. and time of reaction about 20 hours.

COMPLETED MONOMERIC DERIVATIVE

Example 2

The same procedure is followed as in Completed monomeric derivative, Example 1, preceding, except that the dimaleate described under the heading "Oxyethylated glycerol maleate, Example 2" is used instead of the monomaleate.

COMPLETED MONOMERIC DERIVATIVE

Example 3

The same procedure is followed as in the two preceding examples, except that the trimaleate is substituted for the monomaleate or dimaleate in the two preceding examples.

COMPLETED MONOMERIC DERIVATIVE

Example 4

The same procedure is followed as in Examples 2 and 3, immediately preceding, except that for each pound mole of the maleate, or each pound mole of the trimaleate, instead of using one pound mole of (Hydroxylated intermediate, Example 1) as a reactant, one employs two pound moles.

COMPLETED MONOMERIC DERIVATIVE

Example 5

The same procedure is followed as in Example 3, preceding, except that for each pound mole of trimaleate, instead of adding one pound mole of (Hydroxylated intermediate, Example 1), one adds three pound moles of (Hydroxylated intermediate, Example 1) for reaction.

COMPLETED MONOMERIC DERIVATIVE

Example 6

Reference to the preceding examples will show that in each and every instance oxyethylated glycerol (ratio 1 to 15) has been employed as a raw material or primary reactant. In the present instance, a more highly oxyethylated glycerol is employed, to wit, one involving the ratio of 1 to 18. (See Oxyethylated glycerol maleate, Example 4, preceding.)

COMPLETED MONOMERIC DERIVATIVE

Example 7

The same procedure is followed as in Example 6, immediately preceding, except that the oxyethylated glycerol employed represents one having an even higher degree of oxyethylation. For example, one indicated by the ratio of 1 to 21. (See Oxyethylated glycerol maleate, Example 5, preceding.)

COMPLETED MONOMERIC DERIVATIVE

Example 8

The same procedure is followed as in Examples 1 to 7, preceding, except that instead of employing Hydroxylated intermediate, Example 1, preceding, one employs instead Hydroxylated intermediate, Example 2, preceding.

COMPLETED MONOMERIC DERIVATIVE

Example 9

The same procedure is followed as in Examples 1 to 7, preceding, except that instead of employing Hydroxylated intermediate, Example 1, one employs instead Hydroxylated intermediate, Example 3.

COMPLETED MONOMERIC DERIVATIVE

Example 10

The same procedure is followed as in Examples 1 to 7, preceding, except that instead of employing Hydroxylated intermediate, Example 1, one employs instead Hydroxylated intermediate, Example 4.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. (See U. S. Patent No. 2,075,107, dated March 30, 1937, to Frasier.)

Sometimes esterification is conducted most readily in the presence of an inert solvent, that carries away the water of esterification which may be formed, although as is readily appreciated, such water of esterification is absent when such type of reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well-known procedure and requires no further elaboration.

In the previous monomeric examples there is a definite tendency, in spite of precautions, at least in a number of instances, to obtain polymeric materials and certain cogeneric by-products. This is typical, of course, of organic reactions of this kind, and as is well known, organic reactions per se are characterized by the fact that 100% yields are the exception, rather than the rule, and that significant yields are satisfactory, especially in those instances where the by-products or cogeners may satisfactorily serve with the same purpose as the principal or intentional product. This is true in the present instance. In many cases when the compound is manufactured for purposes of demulsification, one is better off to obtain a polymer in the sense previously described, particularly a polymer whose molecular weight is a rather small multiple of the molecular weight of the monomer, for instance, a polymer whose molecular weight is two, three, four, five, or six times the molecular weight of the monomer. Polymerization is hastened by the presence of an alkali, and thus, in instances where it is necessary to have a maximum yield of the monomer, it may be necessary to take such precautions that the alkali used in promoting oxyethylation of glycerol, be removed before subsequent reaction. This, of course, can be done in any simple manner by conversion to sodium chloride, sodium sulfate, or any suitable procedure.

In the preceding examples of the Completed monomeric derivative, Examples 1 to 10, inclusive, no reference is made to the elimination of such alkaline catalyst, in view of the effectiveness of the low multiple polymers as demulsifiers. Previous reference has been made to the fact that the carboxylic hydrogen atom might be variously replaced by substituents, including organic radicals, for instance, the radicals obtained from alcohols, hydroxylated amines, non-hydroxylated amines, polyhydric alcohols, etc. Obviously, the reverse is also true, in that a free hydroxyl group may be esterified with a selected acid, varying from such materials as ricinoleic acid to oleic acid, including alcohol acids, such as hydroxyacetic acid, lactic acid, ricinoleic acid and also polybasic acids of the kind herein contemplated.

With the above facts in mind, it becomes obvious that what has been previously said as to polymerization, with the suggestion that by-products or cogeneric materials were formed, may be recapitulated with greater definiteness, and one can readily appreciate that the formation of heat-rearranged derivatives or compounds must take place to a greater or lesser degree. Thus, the products herein contemplated may be characterized by being monomers of the type previously described, or esterification polymers, or the heat-rearranged derivatives of the same, and thus including the heat-rearranged derivatives of both the polymers and esterification monomers, separately and jointly. Although the class of materials specifically contemplated in this instance is a comparatively small and narrow class of a broad genus, yet it is obviously impossible to present any adequate formula which would contemplate the present series in their complete ramification, except in a manner employed in the hereto appended claims.

Although the products herein contemplated vary so broadly in their characteristics, i. e., monomers through sub-resinous polymers, soluble products, water-emulsifiable oils or compounds, hydrotropic materials, balsams, sub-resinous materials, semi-resinous materials, and the like, yet there is always present the characteristic unitary hydrophile structure related back to the oxyalkylation, particularly the oxyethylation of the glycerol used as the raw material. As hereinafter indicated, in the resolution of oil field emulsions, the demulsifier may be added to the emulsion at the ratio of 1 part in 10,000, 1 part in 20,000, 1 part in 30,000, or for that matter, 1 part in 40,000. In such ratios it well may be that one can not differentiate between the solubility of a compound completed soluble in water in any ratio, and a semi-resinous product apparently insoluble in water in ratios by which ordinary insoluble materials are characterized. However, at such ratios the importance must reside in interfacial position and the ability to usurp, preempt, or replace the interfacial position previously occupied perhaps by the emulsifying colloid. In any event, reviewed in this light, the obvious common property running through the entire series, notwithstanding variation in molecular size and physical make-up, is absolutely apparent. Such statement is an obvious over-simplification of the rationale underlying demulsification, and does not even consider the resistance of an interfacial film to crumbling, displacement, being forced into solution, altered wetability, and the like. As to amidification polymers, for instance, where Z is a polyaminoamide radical, see what is said subsequently.

COMPLETED POLYMERIC DERIVATIVES INCLUDING HEAT-REARRANGED COGENERS

*Example 1*

One pound mole of an oxyethylated glycerol dimaleate is reacted with one pound mole of an alcoholic material of the kind described under the heading "Hydroxylated intermediate, Example 1," preceding, and the mixture is heated at a temperature of approximately 220–240° C., with constant stirring, for a period of 2 to 60 hours, so as to eliminate sufficient water in order to insure that the resultant product has a molecular weight approximately twice that of the initial monomer.

COMPLETED POLYMERIC DERIVATIVES INCLUDING HEAT-REARRANGED COGENERS

*Example 2*

The same procedure is followed as in the preceding example, except that polymerization is continued, using either a somewhat longer reaction time, or it may be, a somewhat higher temperature, or both, so as to obtain a material having a molecular weight of approximately three to four times that of the initial product.

COMPLETED POLYMERIC DERIVATIVES INCLUDING HEAT-REARRANGED COGENERS

*Example 3*

The same procedure is followed as in Example 1 and 2, preceding, except that one employs as a reactant a material of the kind described under the heading "Hydroxylated intermediate, Example 2," instead of "Hydroxylated intermediate, Example 1," as in the previous examples.

COMPLETED POLYMERIC DERIVATIVES INCLUDING HEAT-REARRANGED COGENERS

*Example 4*

The same procedure is followed as in Examples 1 to 3, preceding, except that one polymerizes a mixture instead of a single monomer, for instance, a mixture of materials of the kind described in Completed monomeric derivative, Example 3, and in Completed monomeric derivative, Example 4, are mixed in molecular proportion and subjected to polymerization in the manner indicated in the previous examples.

It is understood, of course, that the polymerized product need not be obtained as a result of a two-step procedure. In other words, one need not convert the reactants into the monomer and then subsequently convert the monomer into the polymer. The reactants may be converted through the monomer to the polymer, in one step. Indeed, the formation of the monomer and polymerization may take place simultaneously. This is especially true if polymerization is conducted in the absence of a liquid such as xylene, as previously described, and if one uses a comparatively higher temperature, for instance, approximately 220° C. for polymerization. Thus, one pound mole of an oxyethylated glycerol polymaleate of the kind previously described is mixed with one pound mole of an alcoholic body of the kind described under the heading "Hydroxylated intermediate, Example 5." Such mixture is reacted for approximately 20 hours at about 220° C. until the mass is homogenous. It is stirred constantly during reaction. Polyfunctionality may reside in dehydration (etherization) of two hydroxyl groups attached to dissimilar molecules.

The fact that the polymerized and heat-rearranged products can be made in a single step, illustrates a phenomenon which sometimes occurs either in such instances where alcoholic bodies of the kind herein illustrated are contemplated as reactants, or where somewhat kindred alcoholic bodies are employed. The reactants may be mixed mechanically to give a homogeneous mixture, or if the reactants do not mix to give a homogeneous mixture, then early in the reaction stage there is formed, to a greater or lesser degree, sufficient monomeric materials so that a homogeneous system is present. Subsequently, as reaction continues, the system may become heterogeneous and exist in two distinct phases, one being possibly an oily body of moderate viscosity, and the other being a heavier material, which is sticky or sub-resinous in nature. In many instances it will be found that the thinner liquid material is a monomer and the more viscous or resinous material is a polymer, as previously described. Such product can be used for demulsification by adding a solvent which will mutually dissolve the two materials, or else, by separating the two heterogeneous phases and employing each as if it were a separate product of reaction.

Conventional demulsifying agents employed in the treatment of oil field emulsions are used as such, or after dilution with any suitable solvent, such as water; petroleum hydrocarbons such as gasoline, kerosene, stove oil, a coal tar product such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, when employed as demulsifiers for water-in-oil emulsions, may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well-known classes of demulsifying agents.

It is well-known that conventional demulsifying agents may be used in a water-soluble form, or in an oil-soluble form, or in a form exhibiting both oil and water-solubility. Sometimes they may be used in a form which exhibits relatively limited oil-solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Cognizance must be taken of the fact that the surface of the reacting vessel may increase or decrease reaction rate and a degree of polymerization, for instance, an iron reaction vessel speeds up reaction and polymerization, compared with a glass-lined vessel.

As has been previously indicated, the sub-genus employed as an alcohol in the present instance is one of a series of alcoholic compounds which are contemplated in our co-pending applications Serial Nos. 447,151, 447,152, 447,153, 447,154, 447,155, 447,156, 447,157, 447,158, 447,159, 447,160, 447,161, 447,162, 447,164, 447,165, 447,166, 447,167, and 447,168, filed June 15, 1942.

It is to be noted that in such instances where the alcoholic body contains a reactive amino hydrogen atom, for instance, in the case where an acylated hydroxylated polyamine is employed, for example, the ricinoleyl acid ester of hydroxyethyl ethylenediamine, the oxyethylated glycerol maleate might react to form an amide of maleic acid. In such instances, of course, such type, to wit, the amido type, is contemplated within the scope of the appended claims in the particular instance, but elaboration is eliminated, because it is unnecessary and would only incur greater length of descriptive matter. Thus, stated in another way, in all appropriate instances, the expression "esterification polymers" in the appended claims, includes amidification polymers, as well as esterification polymers.

Having thus described our invention, what we claim as new and desire to secure by Letters Patent is:

1. A process for breaking petroleum emulsions of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

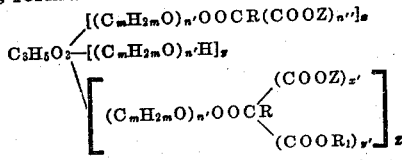

in which R is the carboxyl-free radical of a polybasic carboxy acid having not over 8 carbon atoms; R₁ is an oxyalkylated imidazoline radical substituted in two-position by the radical containing 11–22 carbon atoms selected from the class consisting of alicyclic hydrocarbon radicals, aliphatic hydrocarbon radicals and aliphatic hydrocarbon radicals substituted by hydroxyl radicals; said oxyalkylated imidazoline radical containing a group selected from the class consisting of —N—(R''—O)$_n$H and —NH—(R''—O)$_n$H— groups; wherein R'' denotes an aliphatic radical and $n$ is a small whole number greater than 2 and less than 11; Z is an acidic hydrogen atom equivalent including the acidic hydrogen atom itself; $m$ represents the numerals 2 to 4; $n'$ represents the numerals 3 to 10; $n''$ represents the numerals 1 to 2; $x$ represents the numerals 0 to 2; $y$ represents the numerals 0 to 2; $z$ represents the numerals 1 to 3; $x'$ represents the numerals 0 to 1; and $y'$ to 3; $x'$ represents the numerals 0 to 1; and $y'$ represents the numerals 1 to 2.

2. A process for breaking petroleum emulsions of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

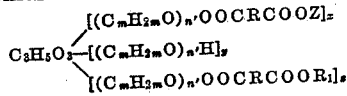

in which R is a carboxyl-free radical of a dibasic carboxy acid having not over 6 carbon atoms; R₁ is an oxyalkylated imidazoline radical substituted in two-position by a radical containing 11–22 car-
bon atoms selected from the class consisting of alicyclic hydrocarbon radicals, aliphatic hydrocarbon radicals and aliphatic hydrocarbon radicals substituted by hydroxyl radicals; said oxyalkylated imidazoline radical containing a group selected from the class consisting of —N—(R''—O)$_n$H and —NH—(R''—O)$_n$H— groups; wherein R'' denotes an aliphatic radical and $n$ is a small whole number greater than 2 and less than 11; Z is an acidic hydrogen atom equivalent including the acidic hydrogen atom itself; $m$ represents the numerals 2 to 4; $n'$ represents the numerals 3 to 10; $x$ represents the numeral 0 to 2; $y$ represents the numerals 0 to 2; and $z$ represents the numerals 1 to 3.

3. A process for breaking petroleum emulsions of the water-in-oil type, characterized by subjecting the emulsion to the action of a demulsifier comprising a member of the class consisting of monomers, sub-resinous esterification polymers, and cogeneric sub-resinous heat-rearranged derivatives of the monomers and aforementioned polymers, separately and jointly, and of the following formula:

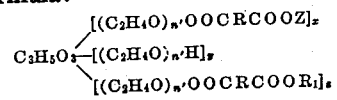

in which R is a carboxyl-free radical of a dibasic carboxy acid having not over 6 carbon atoms; R₁ is an oxyalkylated imidazoline radical substituted in two-position by a radical containing 11–22 carbon atoms selected from the class consisting of alicyclic hydrocarbon radicals, aliphatic hydrocarbon radicals and aliphatic hydrocarbon radicals substituted by hydroxyl radicals; said oxyalkylated imidazoline radical containing a group selected from the class consisting of —N—(R''—O)$_n$H and —NH—(R''—O)$_n$H— groups; wherein R'' denotes an aliphatic radical and $n$ is a small whole number greater than 2 and less than 11; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

4. A process for breaking petroleum emulsions of the water-in-oil type, characterized by subjecting the emulsion to the action of a demulsifier comprising a polar member of the class consisting of monomers, sub-resinous esterification polymers, and cogeneric sub-resinous heat-rearranged derivatives of the monomers and aforementioned polymers, separately and jointly, and of the following formula:

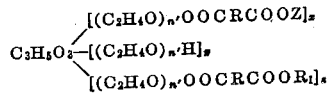

in which R is a carboxyl-free radical of a dibasic carboxy acid having not over 6 carbon atoms; R₁ is an oxyalkylated imidazoline radical substituted in two-position by a radical containing 11–22 carbon atoms selected from the class consisting of alicyclic hydrocarbon radicals, aliphatic hydrocarbon radicals and aliphatic hydrocarbon radicals substituted by hydroxyl radicals; said oxyalkylated imidazoline radical containing a group selected from the group consisting of —N—(R''—O)$_n$H and —NH—(R''—O)$_n$H— groups; wherein R'' denotes an aliphatic radical and $n$ is a small whole number greater than 2 and less than 11; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

5. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

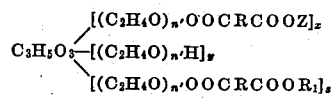
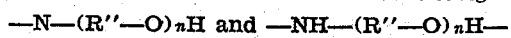

in which R is a carboxyl-free radical of a dibasic carboxy acid having not over 6 carbon atoms; R₁ is an oxyalkylated imidazoline radical substituted in two-position by a radical containing 11-22 carbon atoms selected from the class consisting of alicyclic hydrocarbon radicals, aliphatic hydrocarbon radicals and aliphatic hydrocarbon radicals substituted by hydroxyl radicals; said oxyalkylated imidazoline radical containing a group selected from the class consisting of —N—(R''—O)$_n$H and —NH—(R''—O)$_n$H— groups; wherein R'' denotes an aliphatic radical and $n$ is a small whole number greater than 2 and less than 11; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

6. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

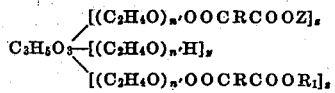
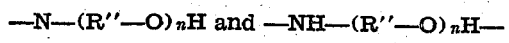

in which R is a carboxyl-free radical of a dibasic carboxy acid having not over 6 carbon atoms; R₁ is an oxyalkylated imidazoline radical substituted in two-position by a radical having 18 carbon atoms selected from the class consisting of alicyclic hydrocarbon radicals, aliphatic hydrocarbon radicals and aliphatic hydrocarbon radicals substituted by hydroxyl radicals; said oxyalkylated imidazoline radical containing a group selected from the class consisting of —N—(R''—O)$_n$H and —NH—(R''—O)$_n$H— groups; wherein R'' denotes an aliphatic radical and $n$ is a small whole number greater than 2 and less than 11; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

7. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

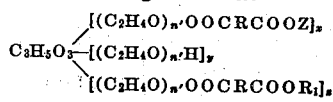
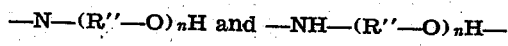

in which R is a carboxyl-free radical of a dibasic carboxy acid having not over 6 carbon atoms; R₁ is an oxyalkylated imidazoline radical substituted in two-position by a higher fatty acid radical having 18 carbon atoms; said oxyalkylated imidazoine radical containing a group selected from the class consisting of —N—(R''—O)$_n$H and —NH—(R''—O)$_n$H— groups; wherein R'' denotes an aliphatic radical and $n$ is a small whole number greater than 2 and less than 11; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

8. A process for breaking petroleum emulsions of the water-in-oil type, characterized by subjecting the emulsion to the action of a demulsifier comprising a polar acidic member of the class consisting of monomers, sub-resinous esterification polymers, and cogeneric sub-resinous heat-rearranged derivatives of the monomers and aforementioned polymers, separately and jointly, and of the following formula:

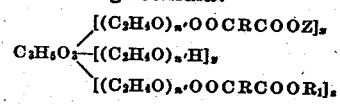
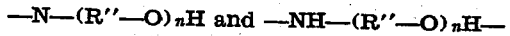

in which R is a carboxyl-free radical of a dibasic carboxy acid having not over 6 carbon atoms; R₁ is an oxyalkylated imidazoline radical substituted in two-position by a ricinoleic acid radical; said oxyalkylated imidazoline radical containing a group selected from the class consisting of —N—(R''—O)$_n$H and —NH—(R''—O)$_n$H— groups; wherein R'' denotes an aliphatic radical and $n$ is a small whole number greater than 2 and less than 11; Z is an acidic hydrogen atom equivalent including the acidic hydrogen atom itself; $n'$ represents the numerals 3 to 10; $x$ represents the numerals 0 to 2; $y$ represents the numerals 0 to 2; and $z$ represents the numerals 1 to 3.

MELVIN DE GROOTE.
BERNHARD KEISER.